US011895472B2

(12) United States Patent
Tracey et al.

(10) Patent No.: US 11,895,472 B2
(45) Date of Patent: Feb. 6, 2024

(54) AUDIO SYSTEM WITH MIXED RENDERING AUDIO ENHANCEMENT

(71) Applicant: Bose Corporation, Framingham, MA (US)

(72) Inventors: James Walter Tracey, Norfolk, MA (US); Guy Anthony Torio, Holliston, MA (US); Eric John Freeman, Sutton, MA (US); Nathan Blagrove, Hanover, MA (US); Santiago Carvajal, Sagamore Beach, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/835,223

(22) Filed: Jun. 8, 2022

(65) Prior Publication Data

US 2023/0403507 A1 Dec. 14, 2023

(51) Int. Cl.

*H04R 3/12* (2006.01)
*H04R 5/02* (2006.01)
*H04R 5/04* (2006.01)
*H04S 7/00* (2006.01)
*G10L 21/0216* (2013.01)

(52) U.S. Cl.

CPC ............ *H04R 3/12* (2013.01); *G10L 21/0216* (2013.01); *H04R 5/02* (2013.01); *H04R 5/04* (2013.01); *H04S 7/30* (2013.01); *H04R 2205/024* (2013.01); *H04R 2420/03* (2013.01); *H04R 2420/07* (2013.01); *H04R 2430/20* (2013.01)

(58) Field of Classification Search

None

See application file for complete search history.

(56) References Cited

U.S. PATENT DOCUMENTS 6,853,732 B2 * 2/2005 Scofield .................. H04S 3/002 381/310
8,442,244 B1 * 5/2013 Long, Jr. ................ H04R 5/027 381/26
10,979,809 B2 * 4/2021 Slack ........................ H04R 3/12
2009/0304214 A1 * 12/2009 Xiang ........................ H04S 7/30 381/307
2011/0150228 A1 * 6/2011 Yoon ........................ H04R 5/02 381/17
2020/0366990 A1 * 11/2020 Goo ........................ H04R 5/033
2021/0243544 A1 8/2021 Tracey et al.

* cited by examiner

*Primary Examiner* — Paul W Huber

(74) *Attorney, Agent, or Firm* — Hoffman Warnick LLC

(57) ABSTRACT

Various implementations include audio systems and methods for mixed rendering to enhance audio output. Certain implementations include an audio system having: at least one far-field speaker configured to output a first portion of an audio signal; and a pair of non-occluding near-field speakers configured to output a second portion of the audio signal in synchrony with the output of the first portion of the audio signal, where the first portion of the audio signal is distinct from the second portion of the audio signal.

24 Claims, 4 Drawing Sheets

AUDIO SYSTEM WITH MIXED RENDERING AUDIO ENHANCEMENT

TECHNICAL FIELD

This disclosure generally relates to audio systems. More particularly, the disclosure relates to mixed rendering audio enhancement in audio systems.

BACKGROUND

Conventional out-loud audio systems suffer from a lack of personalization when multiple users are located in the listening environment. That is, these conventional systems provide the same out-loud audio content to all users in the environment. This conventional approach can limit the user experience.

SUMMARY

All examples and features mentioned below can be combined in any technically possible way.

Various implementations include approaches for enhancing audio output using mixed rendering. Additional implementations include audio systems configured to employ mixed rendering approaches to enhance audio output.

In some particular aspects, an audio system includes: at least one far-field speaker configured to output a first portion of an audio signal; and a pair of non-occluding near-field speakers configured to output a second portion of the audio signal in synchrony with the output of the first portion of the audio signal, where the first portion of the audio signal is distinct from the second portion of the audio signal.

In additional particular aspects, a method of controlling an audio system includes: outputting a first portion of an audio signal to at least one far-field speaker; and outputting a second portion of the audio signal to a pair of non-occluding near-field speakers in synchrony with the output of the first portion of the audio signal, where the first portion of the audio signal is distinct from the second portion of the audio signal.

Implementations may include one of the following features, or any combination thereof.

In some cases, outputting the first portion of the audio signal and the second portion of the audio signal in synchrony is performed within approximately 100 milliseconds (ms).

In certain implementations, the first portion of the audio signal and the second portion of the audio signal include distinct channels of common content.

In particular aspects, the second portion of the audio signal is binaurally encoded, and the second portion of the audio signal increases externalization of content in the audio signal when output in synchrony with the output of the first portion of the audio signal.

In some cases, the second portion of the audio signal enhances speech content within the audio signal.

In particular implementations, the second portion of the audio signal increases intelligibility of the speech content within the audio signal. In some examples, the speech content is removed from an audio track and subsequently added back into the audio track. In particular cases, near-field devices (e.g., wearable audio devices) add a level of audio detail (i.e., clarity) that is not easily achieved from a far-field audio device (e.g., loudspeaker that is meters or more away), thereby improving the impulse response of the audio output. In certain aspects, the far-field audio device can supplement bass output at a near-field device that is non-occluding (e.g., an open-ear wearable audio device), which can struggle to provide desirable bass without occlusion. In such examples, the near-field device and far-field device have complementary audio output benefits.

In certain aspects, the first portion of the audio signal does not include speech content and the second portion of the audio signal includes speech content. In an example, a language of the speech content in the second portion of the audio signal is selectable.

In particular implementations, the first portion of the audio signal and the second portion of the audio signal include distinct frequency ranges from the audio signal. In certain examples, the first portion of the audio signal is output in a frequency range where the sound field is diffuse (or, not modal), for example, approximately 200 Hz or higher. In additional examples, the frequency limits at each device are adjustable to enhance output.

In certain cases, either: i) the first portion of the audio signal has a larger frequency range than the frequency range of the second portion of the audio signal, or ii) the second portion of the audio signal excludes frequencies below a predetermined threshold.

In some aspects, the pair of non-occluding near-field speakers are housed in a wearable audio device. In certain examples, the wearable audio device includes a pair of wirelessly coupled audio devices such as wireless earbuds.

In additional implementations, the pair of non-occluding near-field speakers are housed in a seat, such as in the neck and/or head-supporting portion of a seat.

In particular aspects, a first speaker in the pair of non-occluding near-field speakers is configured to output audio to a left ear of a user and a second speaker in the pair of non-occluding near-field speakers is configured to output audio to a right ear of the user.

In some cases, either: i) the at least one far-field speaker is housed in a soundbar, or ii) the at least one far-field speaker includes multiple speakers configured to output at least left, right, and center channels of the audio signal.

In certain implementations, the at least one far-field speaker is configured to output a third portion of the audio signal when not providing output in synchrony with the pair of non-occluding near-field speakers, the third portion of the audio signal distinct from the first portion of the audio signal. In some examples, the third portion of the audio signal is the entirety of the audio signal.

In certain cases, the at least one far-field speaker is configured to operate differently in different modes, including for example: mode 1: outputting audio in synchrony with a pair of non-occluding near-field speakers, and mode 2: outputting audio alone without outputting in synchrony with the pair of non-occluding near-field speakers. In additional aspects, the pair of non-occluding near-field speakers is configured to operate differently in the different modes, including for example: mode 1: outputting a subset of the frequency range of an audio signal if playing in synchrony with the far-field speaker(s), and mode 2: outputting a greater frequency range of the audio signal than in mode I, up to the full frequency range of the audio signal, if outputting audio alone (or, not in synchrony with the at least one far-field speaker).

In some cases, the second portion of the audio signal is user-configurable to enhance at least one of: externalization, spatialization, or dialog. In particular cases, the second portion of the audio signal is user-configurable via an interface such as a voice interface and/or an application interface on a computing device, e.g., a smart device. In certain cases, the second portion of the audio signal is configurable to adjust tone, equalization, volume and other parameters to different non-occluding near-field speakers. In additional implementations, adjustment of audio output to the at least one far-field speaker is configured to provide the same adjustment, or proportional adjustment, as the audio output to the non-occluding near-field speakers. In still further aspects, audio output adjustments at a given device (e.g., non-occluding near-field speakers and/or far-field speaker(s)) are limited such that at least one parameter of the audio signal is limited to a range. In certain of these aspects, volume adjustment can be limited to a range, tone adjustment can be limited to a range and/or equalization adjustment can be limited to a range.

In particular implementations, user-configurable parameters (e.g., the second portion of the audio signal) are controllable with an interface on the non-occluding near-field speakers, such as via an adjustment interface such as a button, switch, touch interface such as a capacitive touch interface, or a voice interface via a microphone at the non-occluding near-field speakers. In some aspects, the adjustment interface at the non-occluding near-field speakers can include a scroll-through or cycle-through type adjustment mechanism, for example, allowing a user to cycle or scroll through modes with each interface interaction such as a button touch or switch flip.

In additional implementations, the non-occluding near-field speakers can be substituted with an occluding near-field speaker such as over-ear or in-ear headphones operating in a transparency (or, hear-through) mode. In these cases, the occluding near-field speaker can operate in a shared experience (or, social) mode.

In certain cases, the second portion of the audio signal is automatically customized based on detection of a type of device housing at least one of the pair of non-occluding near-field speakers. In some aspects, the type of device is detected using a device identifier, and the second portion of the audio signal is automatically customized based on the device identifier, for example, to adapt the audio output to different device types (e.g., different wearable audio devices). In particular implementations, the customized audio output is triggered based on at least one of: a Bluetooth (BT) connection (or variation of BT connection), a previous BT pairing scenario, or a previously defined coupling between devices.

In some aspects, the pair of non-occluding near-field speakers are configured to output the second portion of the audio signal in synchrony with the output of the first portion of the audio signal in response to a trigger. In particular cases, a trigger can include one or more of: a detected connection between two devices housing the different speakers (such as a wired connection or wireless connection such as BT or Wi-Fi connection), detected directional alignment between two devices housing the different speakers (such as via BT angle of arrival (AoA) and/or angle of departure (AoD) data), a grouping request by a user (such as from an application or a voice command), proximity or location detection (such as devices identified as proximate one another, or within a same zone or space, such as via BT AoA and/or AoD, or Wi-Fi RTT), or a user-initiated trigger or command to output in synchrony.

In particular implementations, the system further includes a first device housing the at least one far-field speaker, where the first device is configured to transmit either the audio signal or the second portion of the audio signal to a second device that includes the pair of non-occluding near-field speakers, wherein the transmission includes playback timing data to enable the second portion of the audio signal to be output in synchrony with the first portion of the audio signal. In certain cases, the audio signal or the second portion of the audio signal is transmitted wirelessly via one or more of: Bluetooth (BT); BT low-energy (LE) audio; broadcast (to the second device and at least one additional device) such as via synchronized unicast; a synchronized downmixed audio connection over BT or other wireless connection; multiple transmission streams such as broadcast, for example, to allow different devices with different pairs of non-occluding near-field speakers to simultaneously output different portions of the audio signal in synchrony with the first portion of the audio signal, such as where one portion focuses on spatialization and/or externalization enhancement and another portion focuses on dialog enhancement, or where one portion includes dialog output in a first language and another portion includes dialog output in a second, different language.

In some cases, the system further includes a first device including the at least one far-field speaker and a second device including the pair of non-occluding near-field speakers, where either, i) the first device and the second device receive the audio signal from a common source device, or ii) the first device receives the first portion of the audio signal from a first source device and the second device receives the second portion of the audio signal from a second source device. In certain aspects, in scenario (i), the common source device can include a television or streaming video player (such as via a wired and/or wireless transmission), for example, where the first device and the second device receive the audio signal wirelessly from a television or streaming video player, or where a soundbar receives the audio signal via a hard-wired connection with the television or streaming video player while the non-occluding near-field speakers receive the audio signal wirelessly from the television or streaming video player. In certain cases, in scenario (ii), the first device such as a soundbar receives the first portion of the audio signal from a first source device such as a television or streaming video player, and the second device such as a wearable audio device receives the second portion of the audio signal from a second source device such as a smartphone, tablet or computing device.

In particular implementations, the first device and the second device receive the audio signal from a common source device, where the audio signal includes audio content accounting for surround effects and height effects, and where outputting the audio signal at the first device and the second device excites a room housing the first device and the second device to enhance externalization for a user. In certain of these cases, the audio output is perceived by the user as object-based (as compared with channel-based), such that the user perceives the audio output as an object in space. In some aspects, the system provides the audio signal with audio content that accounts for surround effects and height effects in response to determining that the non-occluding near-field speakers are likely to be located a minimum distance from the at least one far-field speaker, for example, a distance of several meters or more. In certain of these aspects, the surround effects and height effects are beneficial in large spaces such as religious services, concert halls, arenas, conference rooms and others where the distance between the far-field speaker(s) and the non-occluding near-field speakers satisfies a threshold.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
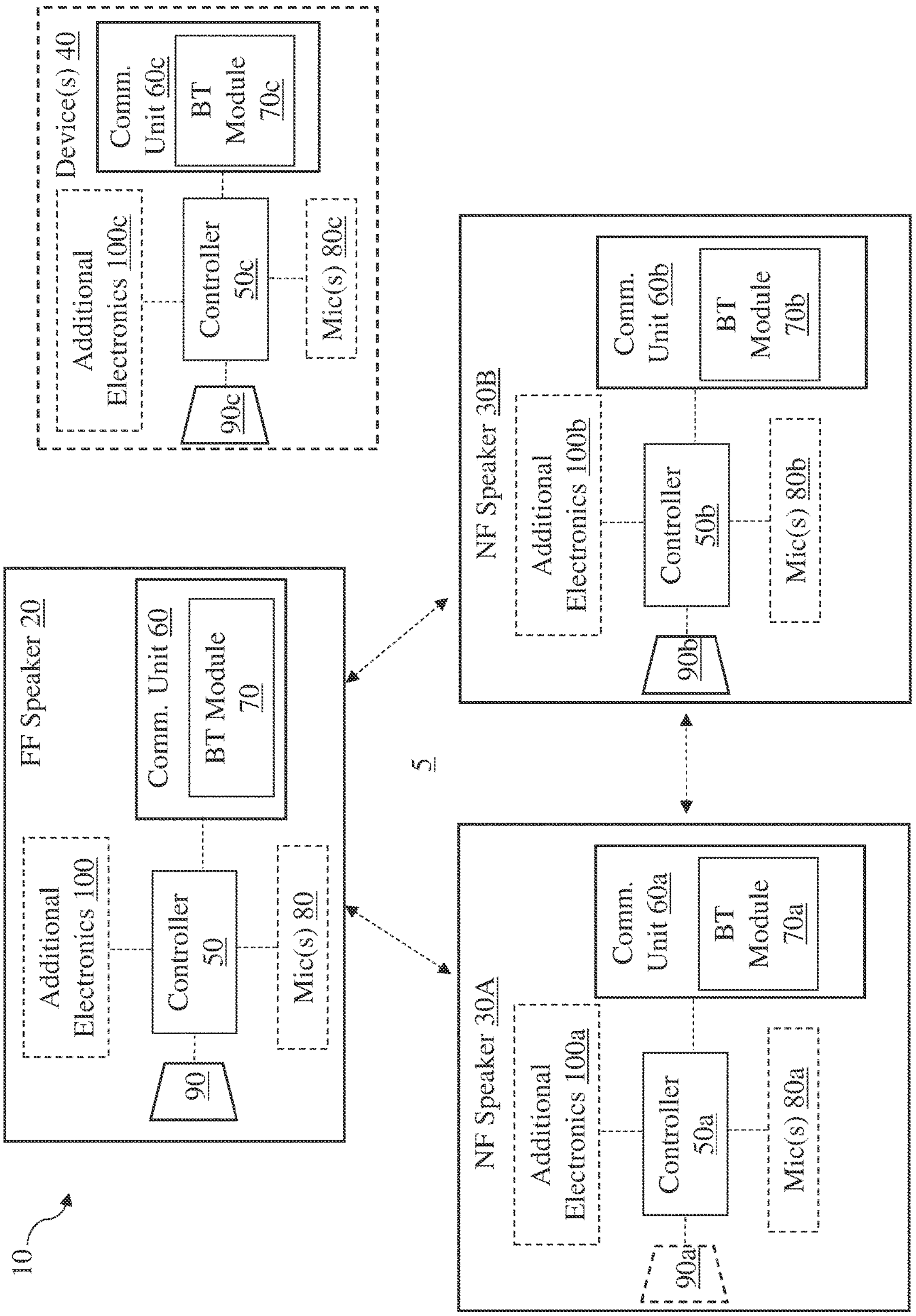
FIG. 1 is a block diagram of a system including a far-field speaker and a set of non-occluding near-field speakers, according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that coordinating audio output at distinct speaker systems can enhance individual user experiences, as well as a group experience.

Conventional audio systems employing dialog enhancement rely on a mix of spectral modification and dynamic range compression. While this mixed approach has benefits, dialog intelligibility is still negatively impacted by one or more speech transmission index (STI) factors, for example: background noise, the quality of audio reproduction equipment, reverberation in a space (e.g., room), and masking effects from other audio content in the mix. Conventional systems fail to adequately account for these STI factors, which can reduce dialog intelligibility.

Additionally, conventional audio systems that employ binaural rendering in an occluding wearable audio device (e.g., over-ear headphones) rely on sophisticated room models and head position (i.e., tracking) data to externalize virtual sounds sources. These conventional approaches are costly and consume a significant amount of power. Further, processing head position data can introduce latency-related drawbacks to these conventional approaches.

The systems and methods disclosed according to various implementations use at least one far-field speaker to output a first portion of an audio signal and a pair of non-occluding (e.g., open-ear) near-field speakers to output a second, distinct portion of the audio signal in synchrony with the output of the first portion. In these cases, the user of the non-occluding near-field speakers (e.g., in-seat speakers or a wearable audio device not occluding the ear canal) can have a personalized audio experience without sacrificing the social aspects of an open-ear audio environment. For example, the user of the non-occluding near-field speakers can experience enhanced audio quality, clarity, personalization/customization, etc., when compared with listening to a far-field speaker alone, without sacrificing social engagement with other users in the same space (due to non-occluding near-field speakers). Moreover, the blending of audio output from the hybrid systems and techniques described herein can provide numerous audio consumption benefits, such as enhanced personalization, enhanced externalization/spatialization, increased dialog intelligibility (e.g., for audio for video content or podcasts), and/or the ability to better experience the full frequency spectrum of the audio content (e.g., experiencing full-body bass as compared to the bass received from an open-ear wearable audio device).

Commonly labeled components in the FIGURES are considered to be substantially equivalent components for the purposes of illustration, and redundant discussion of those components is omitted for clarity.

FIG. 1 shows an example of a space 5 including a system 10 including a set of devices according to various implementations. In various implementations, the devices shown in system 10 include at least one far-field (FF) speaker 20 and a pair of non-occluding near-field (NF) speakers 30A, 30B. One or more additional device(s) 40 are shown, which are optional in some implementations. The additional device(s) 40 can be configured to communicate with the FF speaker 20, NF speaker(s) 30A, 30B and/or other electronic devices in the space 5 using any communications protocol or approach described herein. In certain aspects, the system 10 is located in or around space 5, e.g., an enclosed or partially enclosed room in a home, office, theater, sporting or entertainment venue, religious venue, etc. In some cases, the space 5 has one or more walls and a ceiling. In other cases, the space 5 includes an open-air venue that lacks walls and/or a ceiling.

In various implementations, the at least one far-field speaker 20 includes an audio device not intended for wear by a user, e.g., a stand-alone loudspeaker or a set of loudspeakers such as a soundbar, portable speaker, hard-wired (i.e., semi-permanent or installation-type) speaker, etc. While the speaker 20 is described as a "far-field" device, it is not necessary that the speaker 20 be located within the generally accepted "far-field" acoustic distance relative to any other device in the system 10. That is, the far-field speaker(s) 20 need not be located in the far field to function according to the various implementations described herein. In various implementations, the minimum far field distance is defined as being approximately 0.5 meters away in some cases, approximately two (2) or more meters away in additional cases, and in particular cases, approximately three (3) or more meters away. It is understood that the minimum far field distance may vary based on environment, e.g., within a vehicle (approximately 0.5 meters to approximately 2 meters), in a room within a home (e.g., approximately 2 meters to approximately 5 meters), or in an entertainment venue such as a concert hall (e.g., approximately 5 meters to approximately 50 meters).

In certain cases, the speaker(s) 20 include a controller 50 and a communication (comm.) unit 60 coupled with the controller 50. In certain examples, the communication unit 60 includes a Bluetooth module 70 (e.g., including a Bluetooth radio), enabling communication with other devices over Bluetooth protocol. In certain example implementations, speaker 20 can also include one or more microphones (mic(s)) 80 (e.g., a single microphone or a microphone array), and at least one electro-acoustic transducer 90 for providing an audio output. The speaker 20 can also include additional electronics 100, such as a power manager and/or power source (e.g., battery or power connector), memory, sensors (e.g., IMUs, accelerometers/gyroscope/magnetometers, optical sensors, voice activity detection systems), etc. In some cases, the memory may include a flash memory and/or non-volatile random access memory (NVRAM). In particular cases, memory stores: a microcode of a program for processing and controlling the controller 50 and a variety of reference data; data generated during execution of any of the variety of programs performed by the controller 50; a Bluetooth connection process; and/or various updateable data for safekeeping such as paired device data, connection data, device contact information, etc. Certain of the above-noted components depicted in FIG. 1 are optional, and are displayed in phantom.

In certain cases, the controller 50 can include one or more microcontrollers or processors having a digital signal processor (DSP). In some cases, the controller 50 is referred to as control circuit(s). The controller(s) 50 may be implemented as a chipset of chips that include separate and multiple analog and digital processors. The controller 50 may provide, for example, for coordination of other components of the speaker 20, such as control of user interfaces (not shown) and applications run by the speaker 20. In various implementations, controller 50 includes a (audio) mixed rendering control module (or modules), which can include software and/or hardware for performing audio control processes described herein. For example, controller 50 can include a mixed rendering control module in the form of a software stack having instructions for controlling functions in outputting audio to one or more speakers in the system 10 according to any implementation described herein. As described herein, the controller 50, as well as other controller(s) described herein, is configured to control functions in a mixed rendering audio output approach according to various implementations.

The communication unit 60 can include the BT module 70 configured to employ a wireless communication protocol such as Bluetooth, along with additional network interface(s) such as those employing one or more additional wireless communication protocols such as IEEE 802.11, Bluetooth Low Energy, or other local area network (LAN) or personal area network (PAN) protocols such as WiFi. In particular implementations, communication unit 60 is particularly suited to communicate with other communication units 60 in BT devices 30, 40 via Bluetooth. In additional particular implementations, the communication unit 60 is configured to communicate with BT devices described herein using broadcast audio over a BLE or similar connection (e.g., including a proxy connection). In still further implementations, the communication unit 60 is configured to communicate with any other device in the system 10 wirelessly via one or more of: Bluetooth (BT); BT low-energy (LE) audio; broadcast (e.g., to one or both NF speakers 30A, 30B, and/or additional device 40) such as via synchronized unicast; a synchronized downmixed audio connection over BT or other wireless connection (also referred to as SimpleSync™, a proprietary connection protocol from Bose Corporation, Framingham, MA, USA); multiple transmission streams such as broadcast, for example, to allow different devices with different pairs of non-occluding near-field speakers (e.g., similar to NF Speakers 30A, 30B) to simultaneously output different portions of an audio signal in synchrony with a first portion of an audio signal. In still further implementations, the communication unit 60 is configured to communicate with any other device in the system 10 via a hard-wired connection, e.g., between any two or more devices.

As noted herein, controller 50 controls the general operation of the FF speaker 20. For example, the controller 50 performs processes in controlling audio and data communication with additional devices (e.g., NF speakers 30A, 30B), as well as audio output, signal processing, etc., at the FF speaker 20. In addition to the general operation, the controller 50 initiates a communication function implemented in the communication module 60 upon detecting certain triggers (or, events), described herein. The controller 50 initiates an operation (e.g., synchrony of audio output) between FF speaker 20 and NF speakers 30A, 30B if specific conditions are satisfied.

In certain examples, the Bluetooth module 70 enables a wireless connection using Radio Frequency (RF) communication between the FF speaker 20 and NF speakers 30A, 30B (as well as additional device(s) 40, in certain implementations). The Bluetooth module 70 exchanges a radio signal including data input/output through an antenna (not shown). For example, in a transmission mode, the Bluetooth module 70 processes data by channel coding and spreading, converts the processed data into a Radio Frequency (RF) signal and transmits the RF signal. In a reception mode, the Bluetooth module 70 converts a received RF signal into a baseband signal, processes the baseband signal by de-spreading and channel decoding and restores the processed signal to data. Additionally, the Bluetooth module 70 can ensure secured communication between devices, and protect data using encryption.

As noted herein, Bluetooth-enabled devices include a Bluetooth radio or other Bluetooth-specific communication system enabling connection over Bluetooth protocol. In the example illustrated in FIG. 1, FF speaker 20 is a BT source device (otherwise referred to as "input device", or "host device") and NF speakers 30A, 30B are part of a single BT sink device (otherwise referred to as an "output device", "destination device", or "peripheral device") or are distinct BT sink devices. Example Bluetooth-enabled source devices, include, but are not limited to, a smartphone, a tablet computer, a personal computer, a laptop computer, a notebook computer, a netbook computer, a radio, an audio system (e.g., portable and/or fixed), an Internet Protocol (IP) phone, a communication system, an entertainment system, a headset, a smart speaker, a piece of exercise and/or fitness equipment, a portable media player, an audio storage and/or playback system, a smart watch or other smart wearable device, and so forth. Example Bluetooth-enabled sink devices include, but are not limited to, a headphone, a headset, an audio speaker (e.g., portable and/or fixed, with or without "smart" device capabilities), an entertainment system, a communication system, a smartphone, a vehicle audio system, a piece of exercise and/or fitness equipment, an out-loud (or, open-air) audio device, a wearable private audio device, and so forth. Additional BT devices can include a portable game player, a portable media player, an audio gateway, a BT gateway device (for bridging BT connection between other BT-enabled devices), an audio/video (A/V) receiver as part of a home entertainment or home theater system, etc. A Bluetooth-enabled device as described herein may change its role from source to sink or sink to source depending on a specific application.

In various particular implementations, a first speaker in the NF speakers (e.g., NF speaker 30A) is configured to output audio to a left ear of a user, and a second speaker in the NF speakers (e.g., NF speaker 30B) is configured to output audio to a right ear of the user. In particular implementations, the NF speakers 30A, 30B are housed in a common device (e.g., contained in a common housing), or otherwise form part of a common speaker system. For example, the NF speakers 30A, 30B can include in-seat or in-headrest speakers such as left/right speakers in a headrest and/or seatback portion of an entertainment seat, gaming seat, theater seat, automobile seat, etc. In certain cases, the NF speakers 30A, 30B are positioned within the near-field relative to the user's ears, e.g., up to approximately 30 centimeters. In some of these cases, the NF speakers 30A, 30B can include headrest speakers or body or shoulder-worn speakers that are approximately 30 centimeters from the user's ears, or less. In other particular cases, the near-field distance is approximately 15 centimeters or less, for example, where the NF speakers 30A, 30B include headrest speakers. In further particular cases, the near-field distance is approximately 10 centimeters or less, for example, where the NF speakers 30A, 30B include an on-head or near-ear wearable audio device. In additional particular cases, the near-field distance is approximately 5 centimeters or less, for example, where the NF speakers 30A, 30B include an on-ear wearable audio device. These example near-field ranges are merely illustrative, and various form factors can be considered within one or more of the example range of near field as noted herein.

In still further implementations, the NF speakers 30A, 30B are part of a wearable audio device such as a wired or wireless wearable audio device. For example, the NF speakers 30A, 30B can include earphones in a wearable headset that are either wirelessly coupled or have a hard-wired connection. The NF speakers 30A, 30B can also be part of a wearable audio device in any form factor, for example, a pair of audio eyeglasses, on-ear or near-ear audio devices, or an audio device that rests on or around the user's head and/or shoulder region. As noted herein according to particular implementations, the NF speakers 30A, 30B are non-occluding near-field speakers, meaning that when worn, the speaker 30 and its housing do not fully obstruct (or, occlude) the user's ear canal. That is, at least some ambient acoustic signals can pass to the user's ear canal without obstruction from the NF speakers 30A, 30B. In additional implementations described further herein, the NF speakers 30A, 30B can include occluding devices (e.g., a pair of over-ear headphones or earbuds with canal sealing features) that enable hear-through (or, "aware") mode to pass ambient acoustic signals through as playback to the user's ear.

As shown in FIG. 1, the NF speakers 30A, 30B can include a controller 50*a*, 60*b* and communication unit 60*a*, 60*b* (e.g., having a BT module 70*a*, 70*b*), enabling communication between FF speaker 20 and NF speakers 30A, 30B. Additional device(s) 40 can include one or more components described with reference to FF speaker 20, each of which is illustrated in phantom as optional in certain implementations. Notations "a" and "b" indicate that components in devices (e.g., NF speaker 30A, NF speaker 30B, additional device 40) are physically separate from similarly labeled components in FF speaker 20, but can take a similar form and/or function as their labeled counterparts in FF speaker 20. Additional description of these similarly labeled components is omitted for brevity. Further, as noted herein, additional NF speakers 30A, 30B and additional device(s) 40 can differ from FF speaker 20 in terms of form factor, intended usage, and/or capability, but in various implementations, are configured to communicate with the FF device 20 according to one or more communications protocols described herein (e.g., Bluetooth, BLE, broadcast, SimpleSync, etc.).

In general, the Bluetooth module(s) 70, 70*a*, 70*b* include Bluetooth radios and additional circuitry. More specifically, the Bluetooth module(s) 70, 70*a*, 70*b* include both a Bluetooth radio and a Bluetooth LE (BLE) radio. In various implementations, presence of a BLE radio in the Bluetooth module 70 is optional. That is, as noted herein, various implementations utilize only a (classic) Bluetooth radio for connection functions. In implementations including a BLE radio, the Bluetooth radio and the BLE radio are typically on the same integrated circuit (IC) and share a single antenna, while in other implementations the Bluetooth radio and BLE radio are implemented as two separate ICs sharing a single antenna or as two separate ICs with two separate antennae. The Bluetooth specification, i.e., Bluetooth 5.2: Low Energy, provides the FF speaker 20 with forty channels on 2 MHz spacing. The forty channels are labeled 0 through 39, which include 3 advertising channels and 37 data channels. The channels labeled as 37, 38 and 39 are designated as advertising channels in the Bluetooth specification while the remaining channels 0-36 are designated as data channels in the Bluetooth specification. Certain example approaches of Bluetooth-related pairing are described in U.S. Pat. No. 9,066,327 (issued on Jun. 23, 2015), which is incorporated by reference in its entirety. Further, approaches for selecting and/or prioritizing connection between paired devices are described in U.S. patent application Ser. No. 17/314,270 (filed May 7, 2021), which is incorporated by reference in its entirety.

As noted herein, various implementations are particularly suited for synchronous audio output at both NF speakers 30A, 30B and FF speaker 20. In certain cases, synchronous audio output is coordinated at one or more additional device(s) 40. In particular cases, the controller 50 at one or more of the speakers is configured to coordinate synchronous audio output to enhance the user experience, for example, enabling a personalized audio experience without sacrificing the social aspects of an open-ear audio environment. For example, the user of the NF speakers 30A, 30B can experience enhanced audio quality, clarity, personalization/customization, etc., when compared with listening to the FF speaker 20 alone, without sacrificing social engagement with other users in the same space (due to non-occluding nature of the NF speakers 30).

Figure 2:
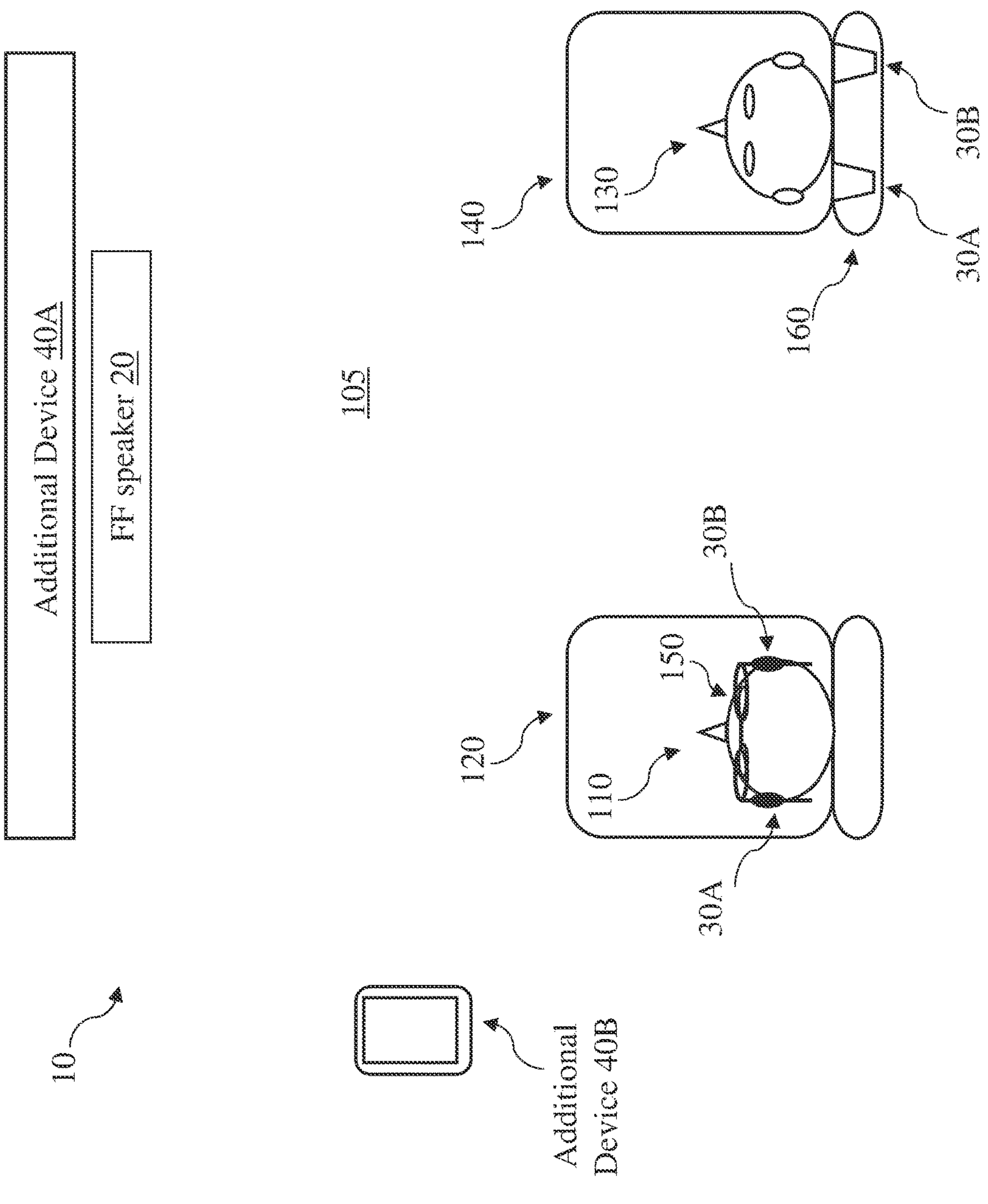
FIG. 2 is a schematic depiction of a space including a far-field speaker and non-occluding near-field speakers according to various implementations.

FIG. 2 illustrates one implementation of an audio system 10 in a space 105 such as a room in a home, office, or entertainment venue. This space 105 is merely one example of various spaces that can benefit from the disclosed implementations. In this example, a first user 110 is present in a first seating location (e.g., seat 120) and a second user 130 is present in a second seating location (e.g., seat 140). User 110 is wearing a wearable audio device 150, which in this example includes a set of audio eyeglasses such as the Bose Frames audio eyeglasses by Bose Corporation of Framingham, MA, USA. In other cases, the wearable audio device 150 can include another open ear audio device such as a set of on-ear or near-ear headphones. In any case, the wearable audio device 150 includes a set of (e.g., two) non-occluding NF speakers 30A, 30B. User 130 is positioned in a seat 140 that includes a set of non-occluding NF speakers 30A, 30B in the headrest and/or neck/backrest portion 160. Also shown in space is a FF speaker 20, which can include a stand-alone speaker such as a soundbar (e.g., one of the Bose Smart Soundbar varieties by Bose Corporation) or a television speaker (e.g., the Bose TV Speaker by Bose Corporation). In additional cases, the FF speaker 20 can include a home theater speaker (e.g., the Bose Surround Speaker varieties and/or Bose Bass Module varieties) or a portable speaker such as a portable smart speaker (e.g., one of the Bose Soundlink varieties or the Bose Portable Smart Speaker, by Bose Corporation) or a portable professional speaker such as the Bose S1 Pro Portable Speaker. In this non-limiting example, additional devices 40A and 40B are present in the space 105. For example, an additional device 40A can include a television and/or a visual display system (e.g., projector-based video system or smart monitor), and additional device 40B can include a smart device (e.g., a smartphone, tablet computing device, surface computing device, laptop, etc.). The devices and interaction of devices in space 105 are merely intended to illustrate some of the various aspects of the disclosure.

Figure 3:
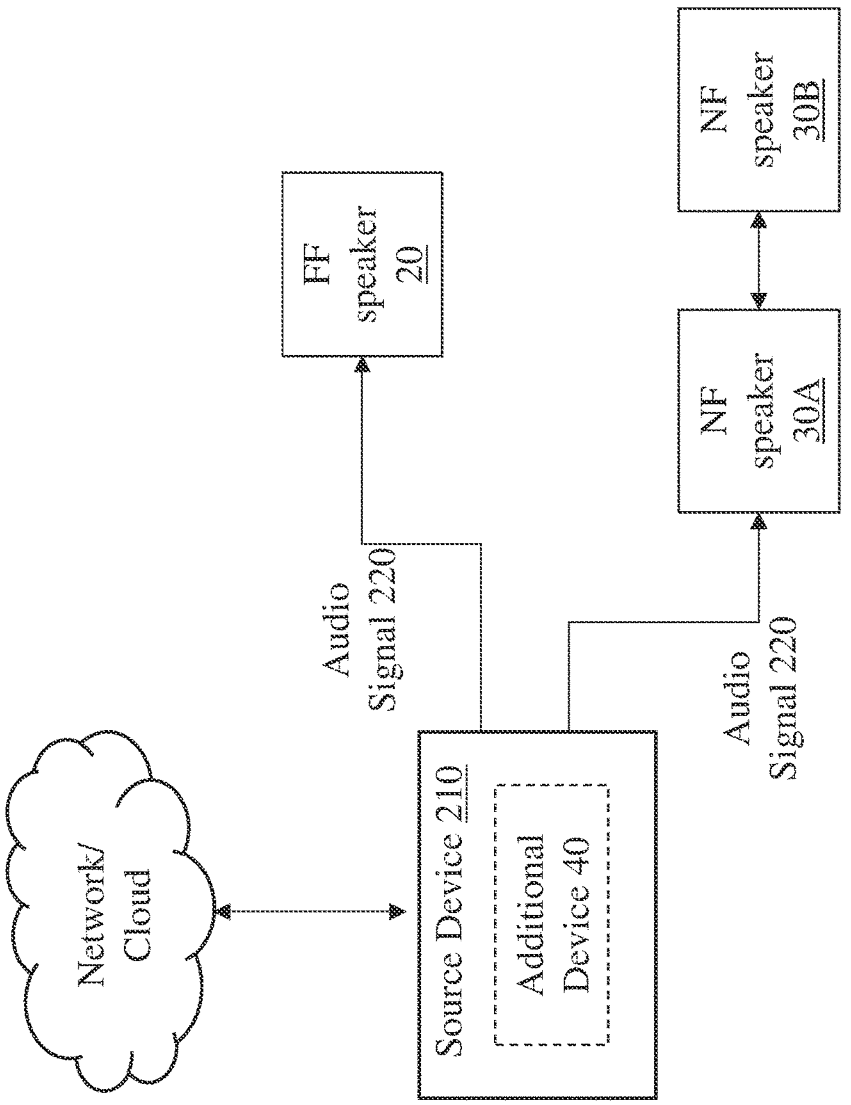
FIG. 3 is an audio signal flow diagram according to various implementations.

With reference to the illustrative example in FIG. 2, according to certain implementations, the audio system 10 is configured to control synchronous audio output in both the FF speaker 20 and the NF speakers 30A, 30B. In particular cases, processes performed according to various implementations are controlled by a controller at one or more of the speakers in audio system 10, e.g., controller 50 in FF speaker 20 and/or controller(s) 50*a*, 50*b* in NF speaker 30A, 30B (FIG. 1). In certain implementations, the FF speaker 20 is configured to output a first portion of an audio signal, and the NF speakers 30A, 30B are configured to output a second portion of the audio signal in synchrony with the output of the first portion of the audio signal. FIG. 3 shows a signal flow diagram illustrating example audio signal flows in conjunction with FIG. 2. As shown in this example, the FF speaker 20 and the NF speakers 30A, 30B can be connected with a common source device 210. In certain implementations, the source device 210 can include one of the additional devices (e.g., television, audio gateway device, smartphone, tablet computing device, etc.) 40 described herein. For example, the source device 210 can include a television system, a smartphone or a tablet. In additional implementations, the source device 210 includes a network-based and/or cloud-based device such as a network connected audio system. In further implementations, the FF speaker 20 and/or the NF speakers 30A, 30B act as a source device, for example, with integrated network and/or cloud communications capabilities. In such a case, the FF speaker 20 and/or NF speakers 30A, 30B receive audio signals from a network (or cloud) connected gateway device such as a wireless or hard-wired internet router. In one example illustrated in FIG. 3, the source device 210 is a network and/or cloud-connected device that runs a software program or software application (also called an "app") configured to manage audio output to the FF speaker 20 and/or NF speakers 30A, 30B. In certain examples, the source device 210 sends signals to both the FF speaker 20 and the NF speakers 30A, 30B. In additional examples, the source device 210 sends signals to the FF speaker 20 or (one or both of) the NF speakers 30A, 30B, which are forwarded between those speaker connections. In certain implementations, NF speakers 30A, 30B forward signals or otherwise synchronize output via "snooping" type approaches. While particular example scenarios are described herein, the FF speaker 20 and the NF speakers 30A, 30B can forward or otherwise transmit signals in any technically feasible manner, and the examples described herein (e.g., SimpleSync, broadcast, BT, etc.) should not be considered limiting of the various implementations.

Figure 4:
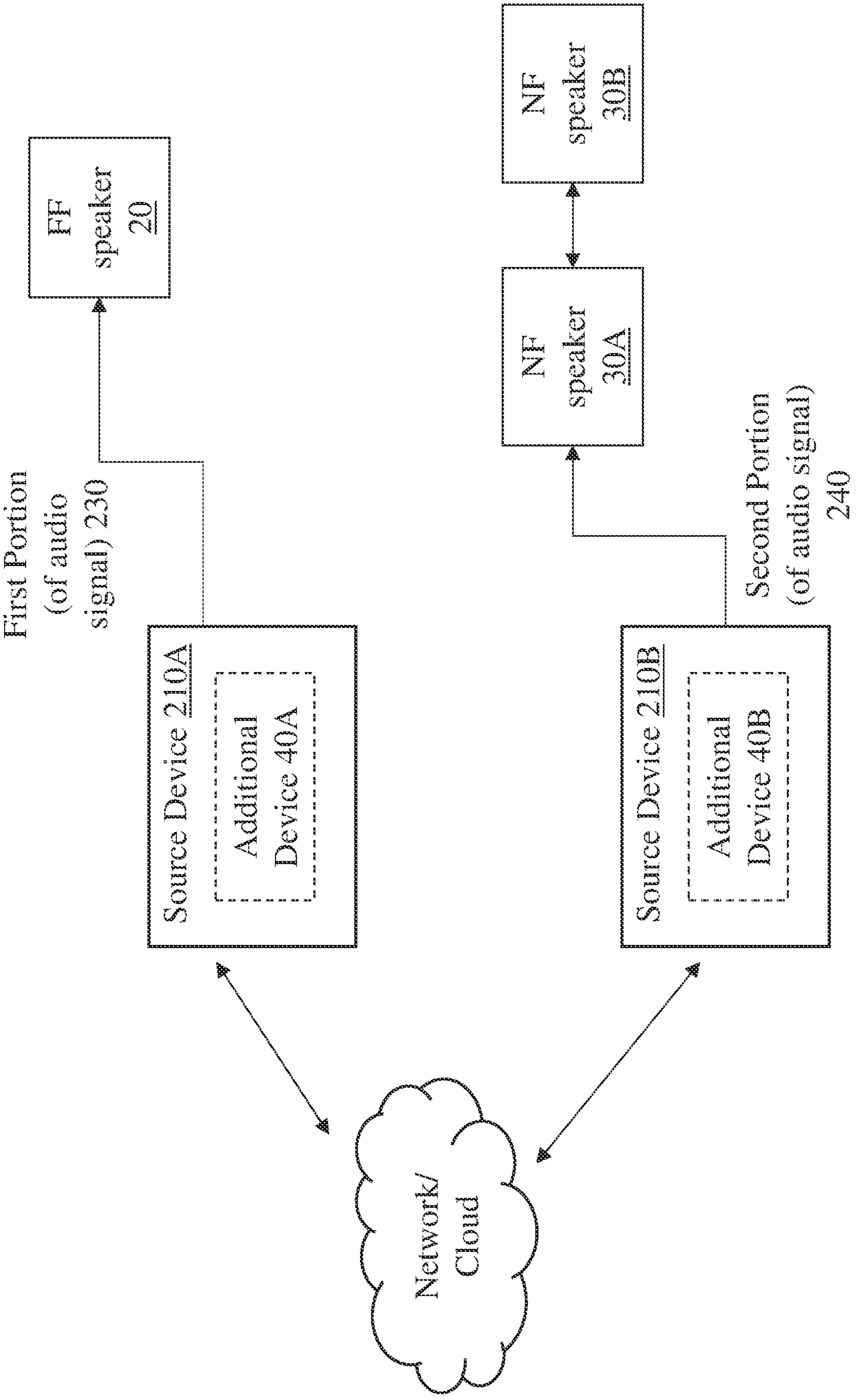
FIG. 4 is an audio signal flow diagram according to various additional implementations.

In particular examples such as illustrated in FIG. 3, the source device 210 sends an audio signal 220 to the FF speaker 20 and the NF speakers 30A, 30B. In further implementations, as illustrated in FIG. 4, two distinct source devices 210A and 210B send signals to the FF speaker 20 and NF speakers 30A, 30B, respectively. For example, using space 105 in FIG. 2 as an example, additional device 40A (e.g., video system) can send a first portion 230 of an audio signal 220 to the FF speaker 20 and additional device 40B (e.g., smartphone or tablet) can send a second portion 240 of an audio signal 220 to one or both sets of the NF speakers 30A, 30B.

With continuing reference to FIG. 2, as well as FIGS. 3 and 4, in an example implementation the FF speaker 20 is configured to output a first portion of an audio signal 220 (e.g., received from a source device 210) and the NF speakers 30A, 30B are configured to output a second, distinct portion of the audio signal 220 (e.g., received from source device 210) in synchrony with the output of the first portion from the FF speaker 20. In some cases, the synchronous output of the first portion of the audio signal 220 and the second portion of the audio signal 220 include outputting those portions at the distinct speakers within approximately 100 milliseconds (ms) of each other.

In some cases, the first portion of the audio signal 220 and the second portion of the audio signal 220 include distinct channels of common content. In certain aspects, the second portion of the audio signal 220 is binaurally encoded, for example, to enhance output at the NF speakers 30A, 30B. In these cases, the second portion of the audio signal 220 increases externalization of content in the audio signal 220 when output in synchrony with the output of the first portion of the audio signal 220 at the NF speaker 20. That is, the controller(s) 50*a*, 50*b* at the NF speakers 30A, 30B can be configured to output the second portion of the audio signal 220 to enhance externalization of the audio signal 220. This enhanced externalization can create, or increase, the perception by the user that the audio signal is output at one or more locations in three-dimensional space that are farther from the user's head than the NF speakers 30A, 30B.

According to particular implementations the second portion of the audio signal 220 enhances speech content within the audio signal 220. For example, the second portion of the audio signal 220 can increase intelligibility of the speech content within the audio signal 220. In some examples, the speech content is removed from an audio track and subsequently added back into the audio track in the second portion of the audio signal 220. As noted herein, signal processing (e.g., removal of speech content and adding back) can be performed at one or more of the devices in a space (e.g., space 105), e.g., at a FF speaker 20, NF speakers 30A, 30B, and/or additional device(s) 40. In still further implementations, one or more portions of the signal processing are performed in a distributed computing system and/or cloud computing system. In particular cases such as those illustrated in FIG. 2, the near-field speaker(s) 30A, 30B (e.g., wearable audio devices) add a level of audio detail (i.e., clarity) that is not easily achieved from a far-field audio device such as FF speaker 20 (e.g., loudspeaker that is meters or more away), thereby improving the impulse response of the audio output. In certain aspects, the far-field speaker 20 can supplement bass output at the NF speakers 30A, 30B that are non-occluding (e.g., an open-ear wearable audio device), which can struggle to provide desirable bass without occlusion. In such examples, the NF speakers 30A, 30B and far-field speaker 20 have complementary audio output benefits (e.g., for users 110, 130, FIG. 2).

In further implementations, the first portion of the audio signal 220 (output at FF speaker 20) does not include speech content and the second portion of the audio signal 220 (output at NF speakers 30A, 30B) includes speech content. In an example, a language of the speech content in the second portion of the audio signal 220 is selectable. For example, users 110 and 130 in the same space 105 may have different language preferences for audio playback (e.g., one with English as a primary language and one with Spanish as a primary language). In such cases, the system 10 can enable one or both users 110, 130 to select the language of the speech content that is output to the NF speakers 30A, 30B. This language selection can be performed via a device interface, e.g., via the interface on an additional device 40 or via any user interface on an audio device such as the wearable audio device 150. In these cases, because the first portion of the audio signal 220 that is output to the FF speaker 20 does not include speech, the language selection at the NF speakers 30A, 30B can be personalized without impacting other users in the space 105.

In particular implementations, the first portion 230 of the audio signal 220 and the second portion 240 of the audio signal 220 include distinct frequency ranges from the audio signal 220. In certain examples, the first portion 230 is output in a frequency range where the sound field is diffuse (or, not modal), for example, approximately 200 Hz or higher. In additional examples, the frequency limits at each device (e.g., FF speaker 20, and NF speakers 30A, 30B) are adjustable to enhance output. In some cases, the adjustability of the frequency limit is based on the device type, and/or are user-selectable (or user-adjustable).

In further implementations, the frequencies of the first portion 230 and the second portion 240 differ in at least one aspect. In some examples, the first portion 230 of the audio signal has a larger frequency range than the frequency range of the second portion 240 of the audio signal. In some such embodiments, a portion of the frequency range of the first portion 230 overlaps with a portion of the frequency range of the second portion 240. In further examples, the entire frequency range of the second portion 240 is within the frequency range of the first portion 230. In additional implementations, the second portion 240 of the audio signal excludes frequencies below a predetermined threshold.

According to certain example implementations, such as those illustrated in FIG. 2, the FF speaker 20 is housed in a soundbar such as one of the Bose Soundbars described herein. In still further implementations, the FF speaker 20 includes multiple speakers that are configured to output at least left channel, right channel, and center channels of the audio signal 220 to a space (e.g., space 105). For example, the FF speaker 20 can include a stereo paired set of portable speakers, e.g., portable speakers configured to operate separately as well as in a stereo pair. In additional examples, the FF speaker 20 can include a plurality of speakers in a stereo and/or surround-sound speaker set, such as two, three, four or more speakers arranged in a space (e.g., space 105).

While certain examples of coordinated audio output between the FF speaker 20 and the NF speakers 30A, 30B are described herein, in some cases, the FF speaker 20 is configured to operate in a manner that is not in synchrony with the NF speakers 30A, 30B. Using FIG. 2 as an example, in some cases the FF speaker 20 is configured to output a third portion of the audio signal 220 when not providing output in synchrony with the NF speakers 30A, 30B. In various embodiments, the third portion of the audio signal 220 is distinct from the first portion of the audio signal. For example, the third portion of the audio signal 220 can include the entirety of the audio signal. In such cases, the NF speakers 30A, 30B may be deactivated (e.g., in a sleep state and/or powered off), or may be outputting audio that is distinct from the audio signal 220.

In particular examples, the FF speaker 20 is configured to operate in distinct modes, e.g., in two or more modes. For example, in a first mode (mode 1), the FF speaker 20 is configured to output audio in synchrony with the pair of NF speakers 30A, 30B, such as in scenarios described with reference to FIGS. 2-4. In a second mode (mode 2), the FF speaker 20 is configured to output audio alone without outputting that audio in synchrony with the pair of NF speakers 30A, 30B. In certain of these cases, the NF speakers 30A, 30B are configured to operate differently when the FF speaker 20 is operating in different modes. For example, when FF speaker 20 operates in mode 1, the NF speakers 30A, 30B are configured to output a subset of the frequency range of an audio signal (e.g., audio signal 220) when outputting audio in synchrony with the FF speaker 20. In additional examples, when the FF speaker 20 operates in mode 2, the NF speakers 30A, 30B are configured to output a greater frequency range of the audio signal (e.g., audio signal 220) than when FF speaker 20 operates in mode 1, up to the full frequency range of the audio signal 220. That is, when the NF speakers 30A, 30B are not outputting audio in synchrony with the FF speaker 20, e.g., when outputting audio alone, the NF speakers 30A, 30B can output up to the full range of the audio signal 220, or at least a greater frequency range of that audio signal than when outputting in synchrony with the FF speaker 20.

As noted herein, the user experience of coordinated output at the FF speaker 20 and NF speakers 30A, 30B can be adjustable or otherwise modifiable, e.g., in response to a particular trigger and/or user commands such as a user interface command. For example, looking at FIGS. 2-4, the second portion 240 of the audio signal 220 is user-configurable to enhance externalization, spatialization and/or dialog. That is, the second portion of the audio signal 240 can be adjustable (e.g., via a user interface command) to enhance the perception of sound being external to the NF speakers 30A, 30B (e.g., in space 105), enhance the perception of sound localizing from a location around the user (e.g., in space 105), and/or to enhance audio output of dialog, such as the dialog in an entertainment program like a television program. In certain examples, the second portion of the audio signal 240 can be configurable to enhance particular sound effects in the audio playback. For example, the second portion of the audio signal 240 can be configured to enhance a portion of an audio track to provide a dramatic effect (e.g., to enhance instrumental playback during a scary movie, to enhance the voice of an actor during a tense scene, to improve the clarity of dialogue in the audio signal 240, and/or to improve spatialization of audio output).

As described herein, the second portion of the audio signal 240 is configured to be user adjustable, for example, in accordance with a user interface command, a user profile or setting, a type of device configured to output the second audio signal 240 (e.g., NF speakers 30A, 30B), and/or a characteristic of the space (e.g., space 105). In certain examples, distinct users (e.g., user 110 v. user 130) user may wish to experience output of the second portion of the audio signal 240 according to particular output settings (e.g., distinct volume levels, distinct equalization settings, etc.). These settings can be adjustable during output or at any other time via user interface adjustments and/or user profile adjustments. In certain examples, the NF speakers 30A, 30B are configured to adjust audio output settings for the second portion of the audio signal 240 according to known or otherwise detected characteristics of the space 105 and/or characteristics of the audio signal 240, e.g., where spatialization and/or dialog clarity is enhanced for the second portion of the audio signal 240 when audio playback includes a podcast or talk show and the space 105 is a vehicle or other small cabin. In further examples, distinct users in a large space such as a concert venue, arena, house of worship, etc., may wish to adjust audio output settings at NF speakers 30A, 30B to enhance particular portions of the audio output. For example, a user who is farther from a soundstage may desire distinct equalization and/or volume settings relative to a user who is closer to the soundstage.

In some examples, the second portion 240 of the audio signal 220 is user-configurable via an interface such as a voice interface and/or an application interface on a computing device, e.g., a smart device such as the additional device 40B in FIG. 2. In particular examples, the voice interface can include a voice interface such as a virtual personal assistant (VPA) that receives and/or processes commands at a wearable audio device such as wearable audio device 150.

As noted herein, according to certain examples the NF speakers 30A, 30B are configured to output the second portion 240 of the audio signal 220 in synchrony with the output of the first portion 230 of the audio signal 220 in response to a trigger. In particular cases, a trigger can include one or more of: a detected connection between two devices housing the different speakers (such as a wired connection or wireless connection such as BT or Wi-Fi connection such as a Wi-Fi RTT connection), detected directional alignment between two devices housing the different speakers (such as via BT angle of arrival (AoA) and/or angle of departure (AoD) data), a grouping request by a user (such as from an application or a voice command, e.g., via additional device 40B or a wearable audio device such as wearable audio device 150), proximity or location detection (such as devices identified as proximate one another, or within a same zone or space, e.g., via BT AoA and/or AoD data, and/or via Wi-Fi RTT), or a user-initiated command or user response to a prompt following a trigger described herein. Any trigger noted herein can cause the controller 50 at a device to prompt the user to initiate the synchronized audio output mode, e.g., with a user interface prompt. The user can then take action in response to the prompt, e.g., by accepting, declining or failing to respond to the prompt via any user interface described herein. In a particular implementation, the user can accept the prompt to initiate the synchronized audio output mode with a gesture, such as a gesture that is detectable by the device housing the NF speakers 30A, 30B.

In certain cases, the second portion 240 of the audio signal 220 is configurable to adjust tone, equalization, volume and/or other parameters to different non-occluding near-field speakers (e.g., NF speakers 30A, 30B). In additional implementations, adjustment of audio output to the at NF speaker(s) 30A, 30B is configured to provide the same adjustment, or proportional adjustment, as the audio output to the FF speaker 20. In still further examples, audio output adjustments at a given device (e.g., NF speakers 30A, 30B and/or far-field speaker(s) 20) are limited such that at least one parameter of the audio signal is limited to a range. In certain of these examples, volume adjustment can be limited to a range, tone adjustment can be limited to a range and/or equalization adjustment can be limited to a range. In particular examples, user-configurable parameters (e.g., the second portion 240 of the audio signal 220) are controllable with an interface on the NF speakers 30A, 30B, such as via an adjustment interface such as a button, switch, touch interface such as a capacitive touch interface, or a voice interface via a microphone at the NF speakers 30A, 30B. In some particular examples, the adjustment interface at the NF speakers 30A, 30B can include a scroll-through or cycle-through type adjustment mechanism, for example, allowing a user to cycle or scroll through modes with each interface interaction such as a button touch or switch flip. In such cases, the user-configurable parameter (e.g., volume, tone, equalization, etc.) is adjustable within a defined range of predetermined (or, lock-step) changes, such that pressing a button once initiates a first change in the parameter, pressing the button again initiates a second (e.g., incremental) change in the parameter, etc., until the extent of the range of adjustment is reached.

In certain cases, the second portion 240 of the audio signal 220 is automatically customized based on detection of a type of device housing one or more of the NF speakers 30A, 30B, e.g., whether the device includes audio eyeglasses, on-ear headphones, near-ear headphones, or in-seat speakers. In some examples, the type of device is detected using a device identifier, and the second portion 240 of the audio signal 220 is automatically customized based on the device identifier, for example, to adapt the audio output to different device types (e.g., different wearable audio devices). For example, the second portion 240 of the audio signal 220 can be output with distinct parameters (e.g., volume or equalization) based on the type of NF speakers 30A, 30B, such that the output of the second portion 240 of audio signal 220 is distinct at a pair of audio eyeglasses as compared to in-seat speakers. In particular implementations, the customized audio output is triggered based on at least one of: a Bluetooth (BT) connection (or variation of BT connection), a previous BT pairing scenario, or a previously defined coupling between devices. This connection trigger can be based on a detected device identifier and/or connection between any devices within communication range in a space (e.g., space 105, FIG. 2). For example, detecting a BT connection, previous BT pairing, or another previously defined coupling between the FF speaker 20 and NF speakers 30A, 30B (e.g., via communication units 60, FIG. 1) can trigger customized audio output based on the NF speaker 30A, 30B device type.

Returning to the example configuration of FIG. 2, with continuing reference to FIG. 1, in certain cases the system 10 includes a first device such as a soundbar or speaker that houses the FF speaker 20. In such cases, the first device is configured to transmit either the audio signal 220 or the second portion 240 of the audio signal 220 to a second device that includes the NF speaker(s) 30A, 30B. For example, the second device can include a seat 140 or head/neck rest portion of a seat 140, or the second device can include a wearable audio device such as wearable audio device 150. Transmission of the audio signal 220 (or the second portion 240 of the audio signal 220) to the second device can include transmitting playback timing data to enable the second portion 240 of the audio signal 220 to be output in synchrony with the first portion 230 of the audio signal 220. In certain examples, the audio signal 220 or the second portion 240 of the audio signal 220 is transmitted wirelessly from the first device to the second device using one or more wireless transmission protocols. In certain cases, the audio signal 220 or the second portion 240 of the audio signal is sent from the first device to the second device via Bluetooth (BT) or BT low-energy (LE) audio. In additional cases, the audio signal 220 or the second portion 240 of the audio signal is sent from the first device to the second device using broadcast (to the second device and at least one additional device) such as via synchronized unicast. In further cases, the audio signal 220 or the second portion 240 of the audio signal is sent from the first device to the second device via a synchronized downmixed audio connection over BT or other wireless connection. In additional examples, the audio signal 220 or the second portion 240 of the audio signal is sent from the first device to the second device via multiple transmission streams such as broadcast, for example, to allow different devices with different pairs of non-occluding near-field speakers (e.g., NF speakers 30A, 30B) to simultaneously output different portions of the audio signal 220 in synchrony with the first portion 230 of the audio signal 220. In some such examples, one portion focuses on spatialization and/or externalization enhancement and another portion focuses on dialog enhancement, or one portion includes dialog output in a first language and another portion includes dialog output in a second, different language. This example configuration enables two users 110, 130 in the same space 105 to experience common content in distinct languages and/or with distinct output parameters (e.g., at distinct volumes, equalization levels, etc.).

Additionally, different sets of NF speakers 30 can receive the same audio signal (e.g., the same second portion 240 of the audio signal) but process that received audio signal locally in different manners in order to provide audio output at the distinct sets of NF speakers 30. For example, a first set of NF speakers 30 and a second set of NF speakers 30 (e.g., in the same space 105, FIG. 2) can receive the same second portion 240 of the audio signal, and locally process that second portion 240 of the audio signal differently in order to output distinct audio to respective users (e.g., first set processes the second portion 240 to focus on enhancing dialog intelligibility while the second set processes the second portion 240 to focus on enhancing externalization/spatialization). Even further, different sets of NF speakers 30 can receive different audio signals such as different second portions 240 of an audio signal, or distinct additional portions (e.g., a first set of NF speakers 30 receives a second portion while a second set of NF speakers 30 receives a third portion, etc.). In certain of these examples, the distinct second portions, or distinct additional portions (e.g., a second portion and a third portion) can be processed (e.g., by the FF speaker 20) prior to being transmitted to the distinct NF speakers 30.

In some cases, as noted herein with respect to FIGS. 3 and 4, either, i) the first device (e.g., including FF speaker 20) and the second device (e.g., including NF speakers 30A, 30B) receive the audio signal 220 from a common source device 210 (FIG. 3), or ii) the first device receives the first portion 230 of the audio signal 220 from a first source device 210A and the second device receives the second portion 240 of the audio signal 220 from a second source device 210B (FIG. 4). In certain examples, in scenario (i), the common source device 210 can include a television or streaming video player (such as via a wired and/or wireless transmission), for example, where the first device and the second device receive the audio signal 220 wirelessly from a television or streaming video player, or where a soundbar receives the audio signal 220 via a hard-wired connection with the television or streaming video player while the NF speakers 30A, 30B receive the audio signal 220 wirelessly from the television or streaming video player. In certain examples, in scenario (ii), the first device such as a soundbar receives the first portion 230 of the audio signal 220 from a first source device 210A such as a television or streaming video player, and the second device such as a wearable audio device receives the second portion of the audio signal 220 from a second source device 210B such as a smartphone, tablet or computing device.

In particular implementations, such as illustrated in the example of FIG. 3, the first device and the second device receive the audio signal 220 from a common source device 210, and the audio signal 220 includes audio content accounting for surround effects and height effects. That is, the audio signal 220 includes audio content that accounts for surround sound (e.g., radial) and/or height (e.g., vertical) effects in the audio output. Certain aspects of audio content having surround and/or height effects are described in U.S. patent application Ser. No. 16/777,404 (US PG PUB 2021/0243544, filed Jan. 30, 2020), which is hereby incorporated by reference in its entirety. In some examples, outputting the audio signal 220 at the first device and the second device excites a room (e.g., space 105, FIG. 2) housing the first device and the second device to enhance externalization for a user. In certain of these cases, the audio output is perceived by the user (e.g., user 110 and/or user 130) as object-based (as compared with channel-based), such that the user perceives the audio output as an object in space. In some examples, the system 10 provides the audio signal 220 with audio content that accounts for surround effects and height effects in response to determining that the NF speakers 30A, 30B are likely to be located a minimum distance from the at least one FF speaker 20, for example, a distance of several meters or more. In certain of these examples, the surround effects and height effects are beneficial in large spaces such as religious services, concert halls, arenas, conference rooms and others where the distance between the FF speaker(s) 20 and the NF speakers 30A, 30B satisfies a threshold.

While various implementations include description of non-occluding variations of NF speakers 30A, 30B, in additional implementations, the NF speakers 30A, 30B can include an occluding near-field speaker such as over-ear or in-ear headphones operating in a transparency (or, hear-through) mode. For example, a pair of headphones that have passive and/or active noise canceling capabilities can be substituted for the non-occluding variation of NF speakers 30A, 30B described herein. In these cases, the occluding near-field speaker can operate in a shared experience (or, social) mode, which can be enabled via a user interface command and/or any trigger described herein. In particular examples, the transparency (or, hear-through) mode enables the user to experience the ambient audio output by the FF speaker 20 while also experiencing the coordinated playback of audio from the NF speakers 30A, 30B.

Additionally, although various implementations are described as beneficially enhancing user audio experiences without knowledge of user head position (e.g., via user head tracking capabilities), these implementations may be used in conjunction with systems configured to track user head position. In such cases, data about user head position (e.g., as indicated by an IMU, optical tracking system and/or proximity detection system) can be used as an input to one or more processing components (e.g., at controller(s) 50) to further enhance the user audio experience, for example, by adjusting output of the second portion of the audio signal 240 (e.g., in terms of spatialization, externalization, etc.). However, data about user head position is not necessary to beneficially deploy the approaches and systems according to various implementations.

In any case, the approaches described according to various implementations have the technical effect of enhancing audio playback for a user in an environment by utilizing both a near-field (non-occluding) speaker and a far-field speaker. For example, the approaches described according to various implementations coordinate audio output at distinct speaker systems to enhance individual user experiences, as well as a group experience. The systems and methods described according to various implementations allow a user of non-occluding near-field speakers (e.g., in-seat speakers or a wearable audio device not occluding the ear canal) to have a personalized audio experience without sacrificing the social aspects of an open-ear audio environment. For example, the user of the non-occluding near-field speakers can experience enhanced audio quality, clarity, personalization/customization, etc., when compared with listening to a far-field speaker alone, without sacrificing social engagement with other users in the same space (due to non-occluding nature near-field speakers). Further, the systems and methods described herein allow users in the same space to share a common audio experience, namely, the audio content output via the far field speakers, while still enabling customization of the audio content output at the near field speakers. Additionally, the far-field speakers can enhance the spatialization and/or externalization of the audio output for the user in the non-occluding scenario, providing a greater impression of three-dimensional sound within a space.

Various wireless connection scenarios are described herein. It is understood that any number of wireless connection and/or communication protocols can be used to couple devices in a space, e.g., space 105 (FIG. 2). Examples of wireless connection scenarios and triggers for connecting wireless devices are described in further detail in U.S. patent application Ser. No. 17/714,253 (filed on Apr. 4, 2022) and Ser. No. 17/314,270 (filed on May 7, 2021), each of which is hereby incorporated by reference in its entirety).

It is further understood that any RF protocol could be used to communicate between devices according to implementations, including Bluetooth, Wi-Fi, or other proprietary or non-proprietary protocols. In implementations where the NF speakers 30A, 30B are housed in a wearable audio device (e.g., FIG. 2), such implementations can advantageously use the wireless protocol(s) otherwise used by the wearable audio device to receive audio data outside of the techniques described herein (such as Bluetooth), thereby eliminating the need for the wearable audio device to include additional componentry and cost.

In implementations that utilize Bluetooth LE Audio, a unicast topology could be used for a one-to-one connection between the FF speaker(s) 20 and the NF speakers 30A, 30B. In some implementations, an LE Audio broadcast topology (such as Broadcast Audio) could be used to transmit one or more sets of audio data to multiple sets of NF speakers 30 (although, the broadcast topology could still be used for only one set of NF speakers 30A, 30B). For instance, in some such implementations, the broadcasted audio data is the same for all of the sets of NF speakers 30 in range, such that all of the sets of NF speakers 30 receive the same audio content. However, in other such implementations, different audio data is broadcasted to the sets of NF speakers 30 in range, such that some NF speakers 30 can select a first audio data and other NF speakers 30 can select a second audio data different from the first audio data. The different audio data could allow for differences in audio personalization (e.g., EQ settings), dialog language selection, dialog intelligibility enhancement, externalization/spatialization enhancement, and/or other differences as can be understood based on this disclosure. Moreover, using the LE Audio broadcast topology (as well as other implementations variously described herein) allows the volume levels of the received audio content to be adjusted locally at each set of NF speakers 30 (as opposed to the single global volume level from the FF speaker(s) 20 in the system 10).

The above description provides embodiments that are compatible with BLUETOOTH SPECIFICATION Version 5.2 [Vol 0], 31 Dec. 2019, as well as any previous version(s), e.g., version 4.x and 5.x devices. Additionally, the connection techniques described herein could be used for Bluetooth LE Audio, such as to help establish a unicast connection. Further, it should be understood that the approach is equally applicable to other wireless protocols (e.g., non-Bluetooth, future versions of Bluetooth, and so forth) in which communication channels are selectively established between pairs of stations. Further, although certain embodiments are described above as not requiring manual intervention to initiate pairing, in some embodiments manual intervention may be required to complete the pairing (e.g., "Are you sure?" presented to a user of the source/host device), for instance to provide further security aspects to the approach.

In some implementations, the host-based elements of the approach are implemented in a software module (e.g., an "App") that is downloaded and installed on the source/host (e.g., a "smartphone"), in order to provide the coordinated audio output aspects according to the approaches described above.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. An audio system comprising:

at least one far-field speaker configured to output a first portion of an audio signal; and a pair of non-occluding near-field speakers configured to output a second portion of the audio signal in synchrony with the output of the first portion of the audio signal, wherein the first portion of the audio signal is distinct from the second portion of the audio signal, and wherein the first portion of the audio signal and the second portion of the audio signal include distinct frequency ranges from the audio signal.

2. The system of claim 1, wherein the first portion of the audio signal and the second portion of the audio signal include distinct channels of common content.

3. The system of claim 1, wherein the second portion of the audio signal is binaurally encoded, and wherein the second portion of the audio signal increases externalization of content in the audio signal when output in synchrony with the output of the first portion of the audio signal.

4. The system of claim 1, wherein the second portion of the audio signal enhances speech content within the audio signal, and wherein the second portion of the audio signal increases intelligibility of the speech content within the audio signal.

5. The system of claim 1, wherein the first portion of the audio signal does not include speech content and wherein the second portion of the audio signal includes speech content.

6. The system of claim 1, wherein the first portion of the audio signal has a larger frequency range than the frequency range of the second portion of the audio signal.

7. The system of claim 1, wherein the pair of non-occluding near-field speakers are housed in a wearable audio device, wherein a first speaker in the pair of non-occluding near-field speakers is configured to output audio to a left ear of a user and wherein a second speaker in the pair of non-occluding near-field speakers is configured to output audio to a right ear of the user.

8. The system of claim 1, wherein the at least one far-field speaker includes multiple speakers configured to output at least left, right, and center channels of the audio signal.

9. The system of claim 1, wherein the at least one far-field speaker is configured to output a third portion of the audio signal when not providing output in synchrony with the pair of non-occluding near-field speakers, the third portion of the audio signal distinct from the first portion of the audio signal.

10. The system of claim 1, wherein the second portion of the audio signal is user-configurable to enhance at least one of: externalization, spatialization, or dialog.

11. The system of claim 1, wherein the second portion of the audio signal is automatically customized based on detection of a type of device housing at least one of the pair of non-occluding near-field speakers, wherein the type of device is detected using a device identifier, and wherein the second portion of the audio signal is automatically customized based on the device identifier such that the second portion of the audio signal is configured to vary, in at least one parameter including volume or equalization, based on distinctions in device identifier.

12. The system of claim 1, wherein the pair of non-occluding near-field speakers are configured to output the second portion of the audio signal in synchrony with the output of the first portion of the audio signal in response to a trigger, the trigger including at least one of: a detected connection between a first device housing the pair of non-occluding near-field speakers and a second device housing the at least one far field speaker, detected directional alignment between the first device and the second device, a grouping request by a user, proximity or location detection between the first device and the second device, or a user-initiated trigger or command to output in synchrony.

13. The system of claim 1, further comprising:

a first device housing a first far-field speaker, wherein the first device is configured to transmit the second portion of the audio signal to a second device that includes the pair of non-occluding near-field speakers, wherein the transmission includes playback timing data to enable the second portion of the audio signal to be output in synchrony with the first portion of the audio signal; and a third device including an additional pair of non-occluding near-field speakers, wherein the first device is configured to transmit a third portion of the audio signal to the third device to allow simultaneous output of distinct portions of the audio signal with the first portion of the audio signal.

14. The system of claim 1, further comprising a first device including the at least one far-field speaker and a second device including the pair of non-occluding near-field speakers, wherein either, the first device and the second device receive the audio signal from a common source device, or the first device receives the first portion of the audio signal from a first source device and the second device receives the second portion of the audio signal from a second source device.

15. The system of claim 1, wherein the at least one far field speaker and the pair of non-occluding near-field speakers receive the audio signal from a common source device, wherein the audio signal includes audio content accounting for surround effects and height effects, and wherein outputting the audio signal at the at least one far field speaker and the pair of non-occluding near-field speakers excites a room housing the at least one far field speaker and the pair of non-occluding near-field speakers to enhance externalization for a user.

16. The system of claim 1, wherein the second portion of the audio signal excludes frequencies below a predetermined threshold.

17. The system of claim 1, wherein the at least one far field speaker is housed in a soundbar.

18. A method comprising:

outputting a first portion of an audio signal using at least one far-field speaker; and outputting a second portion of the audio signal, using a pair of non-occluding near-field speakers, in synchrony with the output of the first portion of the audio signal, wherein the first portion of the audio signal is distinct from the second portion of the audio signal, and wherein the first portion of the audio signal and the second portion of the audio signal include distinct frequency ranges from the audio signal.

19. The method of claim 18, wherein the first portion of the audio signal and the second portion of the audio signal include distinct channels of common content, and wherein the second portion of the audio signal is user-configurable to enhance at least one of: externalization, spatialization or dialog.

20. The method of claim 18, wherein the second portion of the audio signal is binaurally encoded, and wherein the second portion of the audio signal increases externalization of content in the audio signal when output in synchrony with the output of the first portion of the audio signal.

21. The method of claim 18, wherein the second portion of the audio signal enhances speech content within the audio signal, and wherein the second portion of the audio signal increases intelligibility of the speech content within the audio signal.

22. The method of claim 18, wherein the first portion of the audio signal does not include speech content and wherein the second portion of the audio signal includes speech content.

23. The method of claim 18, wherein the first portion of the audio signal has a larger frequency range than the frequency range of the second portion of the audio signal.

24. The method of claim 18, wherein the second portion of the audio signal excludes frequencies below a predetermined threshold.

* * * * *